US012632696B2

(12) United States Patent
Whatmough et al.

(10) Patent No.: US 12,632,696 B2
(45) Date of Patent: May 19, 2026

(54) SYSTEM, CIRCUIT, DEVICE AND/OR PROCESSES FOR ACCUMULATING NEURAL NETWORK SIGNALS

(71) Applicant: Arm Limited, Cambridge (GB)

(72) Inventors: Paul Nicholas Whatmough, Cambridge, MA (US); Zhi-Gang Liu, Westford, MA (US); Matthew Mattina, Boylston, MA (US)

(73) Assignee: Arm Limited, Cambridge (GB)

( * ) Notice: Subject to any disclaimer, the term of this patent is extended or adjusted under 35 U.S.C. 154(b) by 1078 days.

(21) Appl. No.: 17/382,108

(22) Filed: Jul. 21, 2021

(65) Prior Publication Data

US 2023/0026113 A1     Jan. 26, 2023

(51) Int. Cl.
*G06N 3/04* (2023.01)
*G06N 3/063* (2023.01)

(52) U.S. Cl.
CPC ............... *G06N 3/04* (2013.01); *G06N 3/063* (2013.01)

(58) Field of Classification Search
None
See application file for complete search history.

(56) References Cited

U.S. PATENT DOCUMENTS

| | | | | |
|---|---|---|---|---|
| 10,614,798 B2 * | 4/2020 | Seo | ....................... | G10L 15/285 |
| 2009/0007058 A1 * | 1/2009 | Dharmagadda | ......... | G06F 30/30 |
| | | | | 717/104 |
| 2018/0189651 A1 * | 7/2018 | Henry | .................... | G06N 3/044 |
| 2019/0087713 A1 * | 3/2019 | Lamb | .................... | G06F 7/5443 |

OTHER PUBLICATIONS

Deep Compression: Compressing Deep Neural Networks With Pruning, Trained Quantization and Huffman Coding Han et. al. (Year: 2016).*
Bratt, "Arm's First-Generation Machine Learning Processor," Aug. 21, 2018, 27 Pages.
Han, "EIE: Efficient Inference Engine on Compressed Deep Neural Network," ACM/IEEE 43rd Annual International Symposium on Computer Architecture, May 3, 2016, 12 Pages.
Han, "Deep Compression: Compressing Deep Neural Networks with Pruning, Trained Quantization and Huffman Coding," https://arxiv.org/abs/1510.00149v2, Feb. 15, 2016, 14 Pages.

* cited by examiner

*Primary Examiner* — Mandrita Brahmachari
(74) *Attorney, Agent, or Firm* — Berkeley Law & Technology Group, LLP

(57) ABSTRACT

Example methods, devices and/or circuits to be implemented in a processing device to perform neural network-based computing operations. According to an embodiment, an accumulation of weighted activation input values may be computed on accumulation cycles at least in part by multiplying and/or scaling accumulated activation input values by an associated neural network weight.

20 Claims, 3 Drawing Sheets

300

300

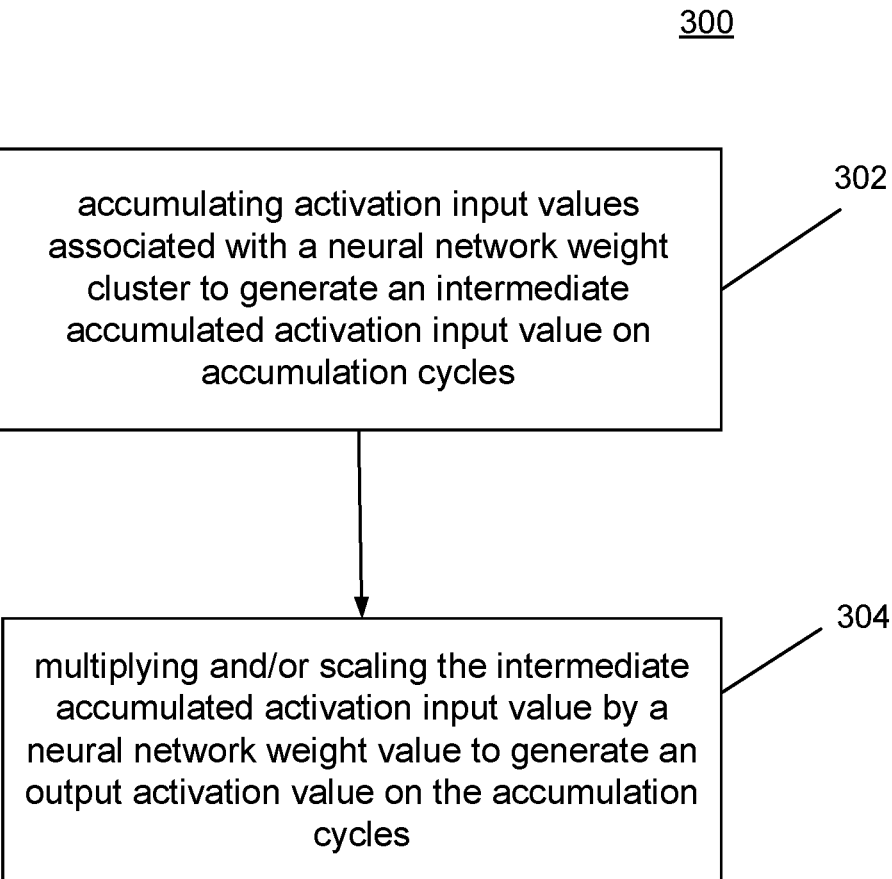

302 accumulating activation input values associated with a neural network weight cluster to generate an intermediate accumulated activation input value on accumulation cycles

304 multiplying and/or scaling the intermediate accumulated activation input value by a neural network weight value to generate an output activation value on the accumulation cycles

*FIG. 3*

SYSTEM, CIRCUIT, DEVICE AND/OR PROCESSES FOR ACCUMULATING NEURAL NETWORK SIGNALS

BACKGROUND

1. Field

The present disclosure relates generally to neural network processing devices.

2. Information

Neural Networks have become a fundamental building block in machine-learning and/or artificial intelligence systems. A neural network may be constructed according to multiple different design parameters such as, for example, network depth, layer width, weight bitwidth, approaches to pruning, just to provide a few example design parameters that may affect the behavior of a particular neural network processing architecture. Particular design choices for such design parameters may be selected based, at least in part, on particular performance and/or cost objectives.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 3 is a flow diagram of a process to accumulate an activation input signal according to an embodiment.

Figure 1:
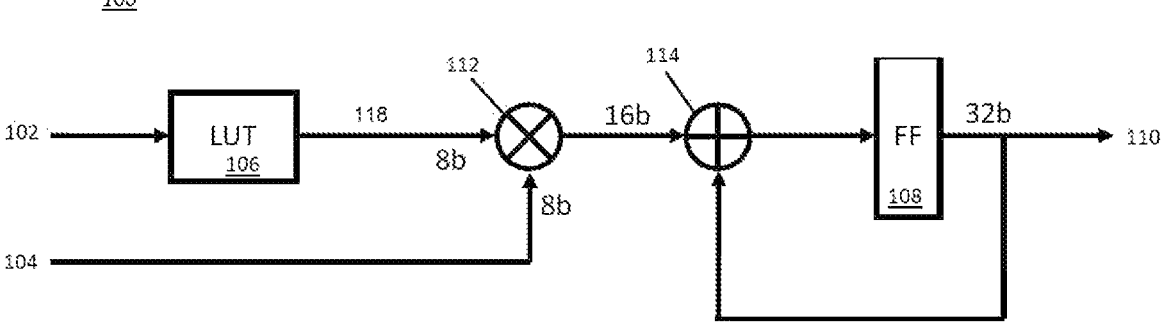
FIG. 1 is a schematic diagram of an accumulation circuit according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, a neural network may comprise a graph comprising nodes to model neurons in a brain. In this context, a "neural network" as referred to herein means an architecture of a processing device defined and/or represented by a graph including nodes to represent neurons that process input signals to generate output signals, and edges connecting the nodes to represent to represent input and/or output signal paths between and/or among the artificial neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented by one or more computing devices such as computing devices such as computing devices including a central processing unit (CPU), graphics processing unit (GPU), digital signal processing (DSP) unit and/or neural network processing unit (NPU), just to provide a few examples. In a particular implementation, neural network weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

Edges in a neural network connecting nodes may model synapses capable of transmitting signals (e.g., represented by real number values) between neurons. Receiving such a signal at a node in a neural network, the node may perform some computation to generate an output signal (e.g., to be provided to another node in the neural network connected by an edge) based, at least in part, on one or more weights and/or numerical coefficients associated with the node and/or edges providing the output signal. In a particular implementation, such weights and/or numerical coefficients may be adjusted and/or updated as learning progresses. For example, such a weight may increase or decrease a strength of an output signal. In an implementation, transmission of an output signal from a node in a neural network may be inhibited if a strength of the output signal does not exceed a threshold value.

According to an embodiment, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In particular implementations, intelligent computing devices to perform functions supported by neural networks may comprise a wide variety of stationary and/or mobile devices, such as, for example, automobile sensors, biochip transponders, heart monitoring implants, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, and/or the like.

In terms of computing resources, neural networks may occupy large amounts of memory for model storage and consume millions of operations per second in real-time execution. As such, computing devices implemented to execute operations of a neural network may consume considerable power and generate considerable heat to be managed and/or controlled using active and/or passive cooling systems.

According to an embodiment, features of a neural network may be compressed (e.g., to occupy less memory and reduce operational complexity) by "clustering" neural network weights associated with nodes and/or edges connecting nodes in a neural network. In an implementation, multiple neural network weights associated with the same neural network weight cluster may be assigned a single neural network weight value. For example, n weights $W=\{w_1, w_2, \ldots, w_n\}$ may be mapped to k clusters $C=\{c_1, c_2, \ldots, c_k\}$, where $n \gg k$. This may significantly reduce memory requirements for storing neural network weights. According to an embodiment, clusters may be associated with a particular unique centroid weight values. One or more neural network weight values may be rounded to a nearest unique centroid weight value of a particular neural network weight cluster to be associated with the particular neural network weight cluster. In application of a neural network weight (e.g., in an operation at an associated neural network node and/or edge) associated with a particular neural network weight cluster, a centroid weight value of the particular neural network weight cluster may be applied. In a particular implementation, centroid values associated with neural network weight clusters may be quantized to a particular fixed-size data type such as a fixed-sized integer word (e.g., INT8, INT16 or INT32).

In an implementation, neural network weights may be assigned unique associated neural network weight indices where a neural network weight index of a particular neural network weight. Such a particular neural network weight may be associated with a cluster to represent membership of the particular neural network weight in the neural network weight cluster. In an embodiment, a neural network weight cluster may be defined based on a range values (e.g., including an associated centroid neural network weight value) to determine which neural network weights are to be members of the neural network weight cluster. The associated centroid neural network weight value may then be applied for such neural network weights that are members of the neural network weight cluster. If a value of a neural network weight is updated (e.g., through training operations), the updated value of the neural network weight may be compared with value ranges associated with predetermined clusters to determine a neural network weight cluster to which the updated neural network weight is to belong.

Briefly, particular embodiments described herein are directed to circuits and/or processes to generated an accumulation of weighted activation input values. In an implementation, activation input values associated with a neural network weight cluster may be computed to generate an intermediate accumulated activation output value on accumulation cycles. The intermediate accumulated activation output value may then be multiplied and/or scaled by a neural network weight value associated with the neural network weight cluster. With application of a neural network weight in a multiplication operation following accumulation of activation input values, circuitry for implementing an accumulation circuit may be simplified and/or may reduce local memory requirements.

Figure 2:
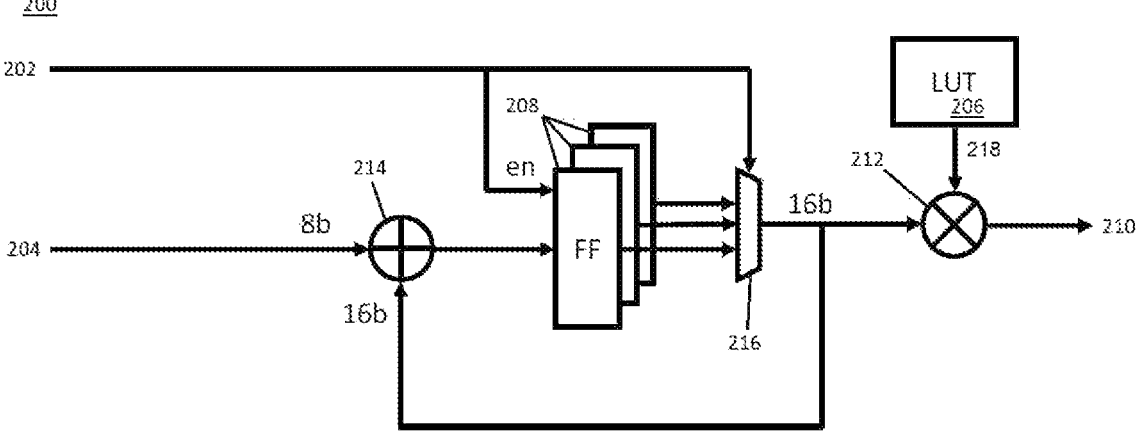
FIG. 2 is a schematic diagram of an accumulation circuit according to an embodiment.

FIGS. 1 and 2 are schematic diagrams of embodiments of an accumulation circuit showing signal paths for digital signals in a particular encoded format. In an implementation, accumulation circuits 100 and 200 may comprise registers, buffers, timing circuitry, etc. (not shown) to implement a flow of signals in fixed-sized word and/or byte formats to represent integer values in an INT8, INT16 and/or INT32 format, for example. It should be understood, however, that these are merely example formats for a digital signal, and that claimed subject matter is not limited in this respect. In one particular implementation, addition circuits 114 and 214 are shown to represent circuitry and/or logic for executing an arithmetical operation (e.g., in an integer domain) to add operand values received on input terminals to provide an output result on an output terminal. Similarly, multiplication circuits 112 and 212 are shown to represent circuitry and/or logic for executing an arithmetical operation (e.g., in an integer domain) to multiply operand values received on input terminals to provide an output result on an output terminal.

According to an embodiment, accumulation circuit 100 may determine an accumulation of weighted input activation signals as an implementation of one or more nodes of a neural network, for example. For example, input activation signal 104 may be received from one or more nodes of an upstream layer (not shown) of such a neural network and output activation signal 110 may be provided to a downstream layer (not shown) of such neural network. In a particular implementation, output activation signal 110 may provide a single output feature map pixel in a convolutional layer of a CNN. It should be understood, however, that this is merely an example of how an output activation signal may be applied, and claimed subject matter is not limited in this respect. According to an embodiment, accumulation circuit 100 may compute a value Z[i] for activation output signal 110 on accumulation cycles i according to expression (1) as follows:

$$Z[i]=Z[i-1]+X[i]\times Y,\qquad(1)$$

where:

X[i] is a value of input activation signal 104; and

Y is weight value 118.

In a particular implementation, weight value 118 to be applied to input activation signal 104 may be associated with one neural network weight cluster from among multiple neural network weight clusters. As discussed above, neural network weights associated with such a cluster of weights may be mapped to the same neural network weight value to be applied for neural network weights associated with the neural network weight cluster. According to an embodiment, an index value 102 may be uniquely associated with a neural network weight, and may map the neural network weight to a particular cluster of weights and/or weight value. According to an embodiment, weight value 108 may be accessed from look-up table (LUT) 106 based on index value 102 that is uniquely associated with a neural network weight. According to an embodiment, LUT 106 may comprise any type of integrated or non-integrated non-transitory memory device that is capable of storing weight values as signals and/or states, for example. In a particular implementation, LUT 106 may comprise a random access memory device that is integrated with accumulation circuit 100.

According to an embodiment, on accumulation cycles, input activation signal 104 may be scaled and/or multiplied by weight value 118 retrieved from ILUT 106, and combined with and/or added to output activation signal 110. As shown, combining and/or adding scaled input activation signal 104 on accumulation cycles may be controlled by flip-flop (FF) circuit 108. In the particular implementation of FIG. 1, an accumulation cycle may entail a multiplication of two 8-bit values at multiplication circuit 112 and an addition of 16-bit result with a 32-bit intermediate accumulated input activation signal at addition circuit 114.

In an alternative implementation in accumulation circuit 200, values of input activation signal 204 may be accumulated on accumulation cycles, followed by application of a neural network weight value 218 retrieved from LUT 206 at multiplication circuit 212. Like LUT 106, LUT 206 may comprise any type of integrated or non-integrated non-transitory memory device that is capable of storing weight values as signals and/or states and, in a particular implementation, may comprise a random access memory device that is integrated with accumulation circuit 200.

In the particular illustrated embodiment, on any particular accumulation cycle, a multiplexer (MUX) 216 may receive, through associated FF circuits 208, an accumulation of values of activation input signal 204. Here, such an accumulation of values of activation input signal 204 may comprise a value of an output signal of MUX 216 added to a current value of input activation signal 204. In the particular illustrated embodiment, MUX 216 may select an input terminal based on and/or associated with index value 202, where index value 202 is uniquely associated with a neural network weight that is a member of a neural network weight cluster.

According to an embodiment, an accumulation of values of activation input signal 204 (provided as an output signal of MUX 216) may be multiplied and/or scaled by a neural network weight value 218 retrieved from LUT 206 to provide an activation output signal 210. Here, neural network weight value 218 may comprise a neural network weight value that is associated with index value 202 and assigned to and/or associated neural network weights that are members of a cluster of neural network weights. In a particular example, neural network weight value 218 may comprise a centroid neural network weight of a neural network weight cluster.

In the particular implementation of accumulation circuit 200, an accumulation cycle may entail an operation to add an 8-bit value and a 16-bit value at addition circuit 214, followed by an operation to multiply a 16-bit value and an 8-bit value at multiplication circuit 212 to provide a 32-bit result. Here, merely adding an 8-bit activation input value to a 16-bit accumulated value of an activation input signal (as output of MUX 216 and without multiplication/scaling by a neural network weight) at addition circuit 214 reduces a dynamic range to 16-bits from a 32-bit dynamic range over an addition operation occurring at addition circuit 114 (FIG. 1). While clustering of neural network weights may enable substantial reduction in local memory storage requirements for a neural network, such a reduction in dynamic range enabled by accumulating smaller values (e.g., at addition circuit 214) prior to application of a weight (e.g., at multiplication circuit 212) may further reduce requirements for local memory storage.

FIG. 3 is a flow diagram of a process 300 to accumulate values of an activation input signal according to an embodiment. In a particular implementation, process 300 may be implemented, at least in part, using accumulation circuit 200 shown in FIG. 2, for example. Block 302 may comprise accumulation of values of an activation input signal received on accumulation cycles. In this context, an "activation input value" as referred to herein means a value to an activation function defined and/or represented by a node in a neural network. In a particular implementation, a value of input activation signal 204 may comprise an activation input value. Likewise, an "activation output value" as referred to herein means an output value provided by an activation function defined and/or represented by a node of a neural network. In a particular implementation, a value of output activation signal 210 may comprise an activation output value. In a particular implementation, accumulation circuit 200 may, at least in part, define an activation function of a neural network node for computing an accumulation of an activation input value expressed in input activation signal 204, for example.

In this context, an "accumulated activation input value" as referred to herein means a summation of discrete value states of a signal over corresponding accumulation cycles. As illustrated in the particular implementation of FIG. 2, activation input values expressed in input activation signal 204 may be accumulated by adding an activation input value in a current accumulation cycle to an intermediate accumulated activation input value determined in a previous accumulation cycle (e.g. at an output terminal of MUX 216).

According to an embodiment, block 304 may comprise scaling and/or multiplying an output signal of MUX 216 by a neural network weight value 218 retrieved from LUT 206, for example. As indicated above, such a neural network weight value 218 may be associated with a cluster of neural network weights (e.g., as a "centroid" value).

According to an embodiment, process 300 may compute a value Z[i] of activation output signal 210 on accumulation cycles i according to expression (1) as follows:

$$Z[i] = \left\{ \sum_{j=1}^{i} X[j] \right\} \times Y, \qquad (2)$$

where:

X[i] is a value of input activation signal 204 on accumulation cycle i; and

Y is neural network weight value 218.

As discussed above, a value for term $$\sum_{j=1}^{i} X[j]$$

in expression (2) may be computed using addition circuit 214 that receives 8-bit and 16-bit operands to provide 16-bit output result. This may enable reduction in memory requirements and/or complexity over an implementation of term Z[i−1]+X[i]×Y in expression (1) using addition circuit 114 that receives 16-bit and 32-bit operands to provide 32-bit output result.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

In a particular implementation, substrate 202 may comprise transistors and/or lower metal interconnects (not shown) formed in processes (e.g., front end-of-line and/or back-end-of-line processes) such as processes to form complementary metal oxide semiconductor (CMOS) circuitry, just as an example. It should be understood, however that this is merely an example of how circuitry may be formed in a substrate in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, accumulation circuit 200 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:

combining, at a first circuit formed in an electronic processing device, input signal values, the input signal values having a first fixed-word and/or byte format and being associated with a same weight cluster of a plurality of weight clusters, to generate an intermediate accumulated input signal value on accumulation cycles, each weight cluster comprising weight values associated with nodes and/or edges connecting nodes in a neural network mapped to a particular unique centroid weight value, the particular unique centroid weight value to be applied at the associated nodes and/or edges connecting nodes in the neural network, at least one of the input signal values selected from among a plurality of input signals based, at least in part, on an index value uniquely associated with the same weight cluster; and combining, at a second circuit formed in the electronic processing device, the intermediate accumulated input signal value and a weight value to generate an output signal value having a second fixed-word and/or byte format on the accumulation cycles.

2. The method of claim 1, wherein:

the weight value comprises an 8-bit expression;

the intermediate accumulated input signal value comprises a 16-bit expression; and the output signal value comprises a 32-bit expression.

3. The method of claim 1, wherein the weight value comprises a centroid weight value to be applied for weight values that are members of the same weight cluster.

4. The method of claim 1, and further comprising retrieving the weight value from a non-transitory storage medium based, at least in part, on an index value uniquely associated with a weight value.

5. The method of claim 4, and further comprising:

selecting the intermediate accumulated input signal value from among signals at a plurality of input terminals of a multiplexer circuit based, at least in part, on the index value.

6. The method of claim 1, and further comprising:

receiving the input signal values from an upstream layer in a neural network; and providing the output signal value to a downstream layer in the neural network.

7. The method of claim 1, wherein the output signal value comprises a single output feature map pixel in a convolutional layer of a convolutional neural network.

8. The method of claim 1, and further comprising:

storing neural network weight values in a non-transitory memory device;

updating one or more of the stored neural network weight values based, at least in part, on the input signal values; and mapping the updated one or more of the stored neural network weight values to an associated neural network weight cluster of the plurality of weight clusters.

9. The method of claim 1, and further comprising:

storing neural network weight values in a non-transitory memory device in association with weight indices, and wherein accumulating activation input signal values associated with the same weight cluster to generate an intermediate accumulated input signal value on accumulation cycles further comprises:

adding the at least one of the input signal values selected from among the plurality of input signals with the intermediate accumulated input signal value to generate an updated intermediate accumulated input signal value.

10. An electronic processing device comprising:

a first circuit to combine input signal values associated with a same weight cluster of a plurality of weight clusters to generate an intermediate accumulated input signal value on accumulation cycles, each weight cluster comprising weight values associated with nodes and/or edges connecting nodes in a neural network mapped to a particular unique centroid weight value, the particular unique centroid weight value to be applied at the associated nodes and/or edges connecting nodes in the neural network, the first circuit to combine the input signal values associated with the same weight cluster to select an input signal value from among a plurality of input signals based, at least in part, on an index value uniquely associated with the same weight cluster; and a second circuit to combine a weight value and the intermediate accumulated input signal value to generate an output signal value on the accumulation cycles.

11. The electronic processing device of claim 10, wherein:

the weight value to comprise an 8-bit expression;

the intermediate accumulated input signal value to comprise a 16-bit expression; and the output signal value to comprise a 32-bit expression.

12. The electronic processing device of claim 10, wherein the weight value to comprise a centroid weight value to be applied for neural network weights that are members of the same weight cluster.

13. The electronic processing device of claim 10, and further comprising a third circuit to retrieve the weight value from a non-transitory storage medium based, at least in part, on an index value uniquely associated with a neural network weight value.

14. The electronic processing device of claim 13, and further comprising:

a fourth circuit to select the intermediate accumulated input signal value from among signals at a plurality of input terminals of a multiplexer circuit based, at least in part, on the index value.

15. The electronic processing device of claim 11, and further comprising:

a circuit to receive the input signal values from an upstream layer in a neural network; and a circuit to provide the output signal value to a downstream layer in the neural network.

16. The electronic processing device of claim 11, wherein the output signal value comprises a single output feature map pixel in a convolutional layer of a convolutional neural network.

17. The electronic processing device of claim 10, and further comprising:

a non-transitory memory device to store neural network weight values;

a circuit to update one or more of the stored neural network weight values based, at least in part, on the input signal values; and a circuit to map the updated one or more of the stored neural network weight values to an associated neural network weight cluster of the plurality of weight clusters.

18. The electronic processing device of claim 10, and further comprising:

a non-transitory memory device to store neural network weight values in association with weight indices, and wherein accumulation of input signal values associated with a weight cluster of the plurality of weight clusters to generate the intermediate accumulated input signal value on accumulation cycles to further comprise:

a sum of the selected input signal value with the intermediate accumulated input signal value to generate an updated intermediate accumulated input signal value.

19. An article comprising:

a non-transitory storage medium comprising computer-readable instructions stored thereon that are executable by one or more processors of a computing device to:

express a first circuit, to be formed in electronic processing device, to combine input values associated with a same weight cluster of a plurality of weight clusters to generate an intermediate accumulated input signal value on accumulation cycles, each weight cluster comprising weight values associated with nodes and/or edges connecting nodes in a neural network mapped to a particular unique centroid weight value, the particular unique centroid weight value to be applied at the associated nodes and/or edges connecting nodes in the neural network, the first circuit to combine the input values associated with the same weight cluster to select an input value from among a plurality of input signals based, at least in part, on an index value uniquely associated with the same weight cluster; and express a second circuit, to be formed in the electronic processing device, to combine a weight and the intermediate accumulated input signal value to generate an output signal value on the accumulation cycles.

20. The article of claim 19, the computer-readable instructions are formatted according to a register description language.

\* \* \* \* \*